(12) United States Patent
Recker et al.

(10) Patent No.: US 8,182,626 B2
(45) Date of Patent: May 22, 2012

(54) TIRE COMPOSITION WITH IMPROVED VULCANIZING AGENT

(75) Inventors: Carla Recker, Hannover (DE); William Michael York, Concord, NC (US); Thomas Kramer, Springe (DE); Katharina Herzog, Harsum (DE); Boris Mergell, Barsinghausen (DE); Richard W. Cruse, Yorktown Heights, NY (US)

(73) Assignee: Continental AG, Hannover (DE)

( * ) Notice: Subject to any disclaimer, the term of this patent is extended or adjusted under 35 U.S.C. 154(b) by 280 days.

(21) Appl. No.: 12/290,427

(22) Filed: Oct. 30, 2008

(65) Prior Publication Data
US 2010/0108239 A1 May 6, 2010

(51) Int. Cl.
*B29C 35/00* (2006.01)
*B29C 35/02* (2006.01)
*C08J 3/24* (2006.01)

(52) U.S. Cl. ............ 156/110.1; 524/430; 524/578; 524/575.5; 524/571; 524/579; 524/495; 524/394; 152/158

(58) Field of Classification Search .......... 524/394, 524/575.5, 571, 579, 495; 152/158; 156/110.1
See application file for complete search history.

(56) References Cited

U.S. PATENT DOCUMENTS

| | | | |
|---|---|---|---|
| 5,342,900 A | 8/1994 | Wolpers et al. | |
| 6,130,318 A | 10/2000 | Wild et al. | |
| 6,482,884 B1 * | 11/2002 | Schaal et al. ............ | 524/492 |
| 7,189,866 B2 | 3/2007 | Belin | |
| 7,411,018 B2 | 8/2008 | Appel et al. | |
| 2002/0058760 A1 | 5/2002 | Jeske et al. | |
| 2005/0090680 A1 | 4/2005 | Belin | |
| 2005/0239946 A1 * | 10/2005 | Lin et al. ............ | 524/492 |
| 2006/0161015 A1 | 7/2006 | Klockmann et al. | |
| 2007/0167557 A1 | 7/2007 | Dumke et al. | |
| 2008/0161463 A1 * | 7/2008 | Cruse et al. ............ | 524/266 |
| 2008/0161475 A1 * | 7/2008 | York et al. ............ | 524/494 |

FOREIGN PATENT DOCUMENTS

| | | |
|---|---|---|
| DE | 442 3131 | 1/1996 |
| DE | 603 03 203 T2 | 9/2006 |
| EP | 0 530 590 B1 | 3/1993 |
| WO | WO 0237877 | 5/2002 |
| WO | WO 2008/003514 | 1/2008 |
| WO | WO 2008/083241 | 7/2008 |
| WO | WO 2008/083242 | 7/2008 |
| WO | WO 2008/083244 | 7/2008 |

OTHER PUBLICATIONS

U.S. Appl. No. 11/617,683, filed Jul. 2008, York et al.
U.S. Appl. No. 11/617,649, filed Jul. 2008, York et al.
U.S. Appl. No. 11/617,663, filed Jul. 2008, York et al.
U.S. Appl. No. 11/617,653, filed May 2007.
DIN 53 505, Aug. 2000. (Spec, pp. 8-9 and 26-27).
DIN 53 513, Mar. 1990. (Spec, pp. 8-9 and 26).
ASTM-D-2240, Sep. 2005. (Spec, pp. 8-9).
ASTM-D-1646, Nov. 2007. (Spec, p. 26).
DIN 53 529—Parts 1-4, Mar. 1983, Mar. 1983, Jun. 1983, and Apr. 1991, respectively. (Spec, p. 26).
DIN 53 504, Oct. 2009. (Spec, p. 26 and 28).
DIN 53 512, Apr. 2000. (Spec, p. 26 and 27).
ISO 4662, Aug. 15, 2009 replaces ASTM-D-1054. (Spec, p. 26) (also the same as DIN 53 512).
DIN ISO 4649, Nov. 2006 same as DIN 53 516. (Spec, p. 26 and 28).
Grosch, K. A. et al., "A New Laboratory Method to Determine the Traction and Wear Properties of Tire Tread Compounds," Kautschuk Gummi Kunststoffe, 50, pp. 841-851, 1997. (Spec, p. 28).
DIN ISO 34-1, Jul. 2004 replaces DIN 53 515. (Spec, p. 28) (also the same as ASTM-D-624).
DIN EN ISO 8256, May 2005 replaces DIN 53 448. (Spec, p. 28).
ASTM-D-624, Sep. 2000. (Spec, p. 28).
K. Grosch, "Rolling Resistance and Fatigue Life of Tires," 131th ACS Rubber Div. Meeting, American Chemical Society, Montreal, Quebec, Canada, 1987, pp. 42-63. (Spec, p. 28).

* cited by examiner

*Primary Examiner* — James J Seidleck
*Assistant Examiner* — Deve E Valdez
(74) *Attorney, Agent, or Firm* — Collard & Roe, P.C.

(57) ABSTRACT

A tire composition with a Shore A hardness, according to DIN 53 505 and ASTM D2240, of not less than 40 and not greater than 95 and a glass-transition temperature $T_g$ (E"max), according to DIN 53 513 with a specified temperature sweep of $-80°$ C. to $+80°$ C. and a specified compression of $10+0.2\%$ at 10 Hz, not less than $-80°$ C. and not greater than $0°$ C., with improved abrasion performance, in particular for pneumatic tires, has the following composition:

at least one vulcanizable diene rubber selected from natural rubbers, synthetic polyisoprene rubbers, polyisobutylene rubbers, polybutadiene rubbers (BR), and random styrene-butadiene rubbers;

from 35 to 300 phr of at least one active filler selected from carbon blacks, silicas, silicon based fillers, and metal oxides, of which at least 10 phr must be carbon blacks, silicas, or some combination thereof;

from 0 to 250 phr of other or further additives;

from $0.1 \cdot 10^{-3}$ to $42 \cdot 10^{-3}$ mhr (mol per hundred parts of rubber) of a vulcanizing agent which crosslinks with a functionality>4; and from 0.1 to 10 phr of at least one vulcanization accelerator.

25 Claims, 2 Drawing Sheets

TIRE COMPOSITION WITH IMPROVED VULCANIZING AGENT

BACKGROUND OF THE INVENTION

1. Field of the Invention

The invention relates to a tire composition with improved abrasion performance and fatigue resistance, in particular for tires.

2. The Prior Art

A very wide variety of additives is admixed with the mixtures in order to influence the properties of the mixture and of the vulcanizate, and/or specific polymers are used for this purpose. Examples that may be mentioned here of additives are fillers (e.g. carbon black), plasticizers, antioxidants, and crosslinking systems composed of sulfur, accelerators, and activators. However, if one property is improved by varying the mixture, this is often attended by impairment of another property, and there are therefore certain conflicts of objectives. Examples of these conflicting objectives in the case of mixtures for tire treads are found in relation to abrasion performance, fatigue resistance and increased build-up of heat, which causes poorer rebound resilience and therefore poorer rolling resistance. A particular method used to solve these conflicts of objectives is variations in the constitution of the mixture, and also in particular changes or modification in additives, the aim being to achieve an improved level of properties which are usually inversely correlated.

An important group of additives which influences vulcanization rate and the physical properties of the vulcanizates is the group of the vulcanization accelerators. There are various groups of vulcanization accelerators available for production of tires and known to the person skilled in the art, and these can also be used in combination with one another, sometimes giving synergistic effects.

These vulcanization accelerators serve for activation of the sulfur used as vulcanizing agent. The addition of sulfur and vulcanization accelerator here is individually matched to the tire-rubber-mixture properties to be achieved. These properties to be achieved are a function of the network produced during vulcanization, e.g. between polymer chains itself or polymers and fillers, and great importance can therefore be attached to the nature and the degree of crosslinking with a view to the physical properties of the vulcanizates.

Special importance is the structure of the crosslink, well-known for those skilled in the art. S-length distribution influences fatigue behavior.

The prior art in relation to vulcanization systems or crosslinking systems will now be described in more detail, using the following publications:

(D1) DE 603 03 203 T2
(D2) U.S. Pat. No. 5,342,900
(D3) US 2002/0058760A1
(D4) EP 0 530 590 B1
(D5) U.S. Pat. No. 7,189,866

D1 discloses a polysulfide siloxane that can be used as crosslinking agent, and the process for its preparation. The crosslinking system here encompasses the polysulfide siloxane described and at least one primary vulcanization accelerator. The polysulfide siloxane is used in a composition based on a diene elastomer and on a reinforcing filler. The diene elastomer described here comprises various components and the fillers described here comprise in particular silica and carbon black, and each of the examples disclosed here relates to a rubber mixture composed of natural rubber as single polymer and carbon black as single filler.

D2 discloses a vulcanized diene rubber wherein the vulcanizing is carried out in the presence of a cross linker containing benzyl groups, sulfur and mercapto accelerator and a sulfenamide accelerator.

D3 discloses a molding method for protective equipment, particularly one capable of sufficiently connecting a plastic plate and a foam member of a piece of protective equipment and molding both in shape at the same time without any adhesive periphery.

D4 discloses a process for the production of diene rubber vulcanizates with very high aging resistance and reversion resistance. The diene rubber vulcanizates here comprise from 1 to 2.5 parts of mercapto accelerator or from 0.2 to 0.8 part of sulfenamide accelerator, or from 0.3 to 2.5 parts of mercapto accelerator and from 0.1 to 0.8 part of sulfenamide accelerator. From 0.1 to 0.2 part of sulfur is also used per 100 parts of rubber, preferably of an oil-extended diene rubber.

D5 relates to cross-linking agents usable for cross-linking elastomeric networks, in particular in the manufacture of tires or semi-finished products for tires. In the examples the process is carried out with the cyclic polysulfurized tetramethyldisiloxane. This process shows that it is possible to cross-link without the addition of sulfur, a rubber composition. Also demonstrated is improvement in the thermal stability (reversion behaviour) of the compositions based on the polysulfide.

The disclosure of each of the above prior art documents is herewith incorporated by reference.

Elemental sulfur is commonly used as a vulcanizing agent for unsaturated organic polymers. The crosslinks that sulfur forms with the organic polymer are primarily polysulfidic crosslinks that reduce the thermal stability of the vulcanizates. The use of organic compounds that have sulfur containing reactive groups is known in the art as vulcanizing agents for diene rubbers. These sulfur-containing compounds often contain only two dithiocarbamate or sodium thiosulphonate groups chemically bonded to a bridging group. The low number of tie points are ineffective at crosslinking the unsaturated diene polymers and achieve vulcanizates with a good balance of wear and tear resistance. It would be desirable to have a new type of crosslinker for elastomers that would improved fatigue, tear and wear properties, especially tear and abrasive wear, while maintaining hardness.

Usually rubber mixtures are vulcanized with crosslinkers providing two tie points, which, according to theory, have a crosslink functionality of 4, which means that 4 polymer arms are linked with the crosslink. In the process the crosslink-density in crosslinked rubber mixture is approximately between $10 \cdot 10^{-5}$ to $25 \cdot 10^{-5}$ mol/cm$^3$ (determination by equilibrium swelling in unfilled rubber compounds).

SUMMARY OF THE INVENTION

A technical problem solved by the present invention is that tire wear is improved by 10% and high speed tear energy is increased by about 30% in tire tests. The invention solves the aforementioned problem in the following manner. The multifunctional crosslinker provides a crosslinking agent having a functionality of higher than 4. If the functionality is, e. g., 6, three crosslinks per molecule in the polymer matrix are introduced versus two (a functionality of four) that are found in the present state of the art. The newly formed centers of crosslinking deflect crack growth and the flexibility of these centers absorbs energy to prevent tearing.

As one example the present invention solves the aforementioned problem in the following manner. Crosslink-structures are inserted into the rubber mixture which have a higher functionality. Here, it has to be considered that for example 3 conventional crosslinks providing a functionality of 4 (see FIG. 1) versus 2 crosslinks providing a functionality of 6 (see FIG. 2) in the rubber mixture and lead to the same stiffness and analytical crosslink density. For example concerning a complete insertion into a rubber mixture, approximately $6.6 \cdot 10^{-5}$ to $18 \cdot 10^{-5}$ mol/cm$^3$ crosslinks with a functionality of 6 are inserted.

The central structured unity can also be composed by fixed elements or elements of any other chemical nature as hydrocarbons (e.g. Siloxan). Already a partly done insertion of higher functional elements leads to the desirable effect described above.

Advantages of the invention include:
1. Bonds in 3 vs 2 points;
2. Has a flexible core structure; and
3. Provides second network of crosslinking in the polymer matrix.

Another technical problem solved by the present invention is that of improving the dynamic stability/durability of rubber mixtures with the result of better tire durability or abrasion (grit), for example concerning improved HSTE-values. The advantages of the present invention and its technical features are for the production of tires with improved tread durability, for example better behavior against chipping and chunking. By application in body compounds a better durability and fatigue behavior (or resistance) is achieved.

It is an object of the present invention to provide a tire composition which solves or at least mitigates the abovementioned conflict of objectives, and specifically by using an optimized vulcanizing agent for improving abrasion performance and fatigue resistance while other physical properties remain almost unaltered.

Figure 1:
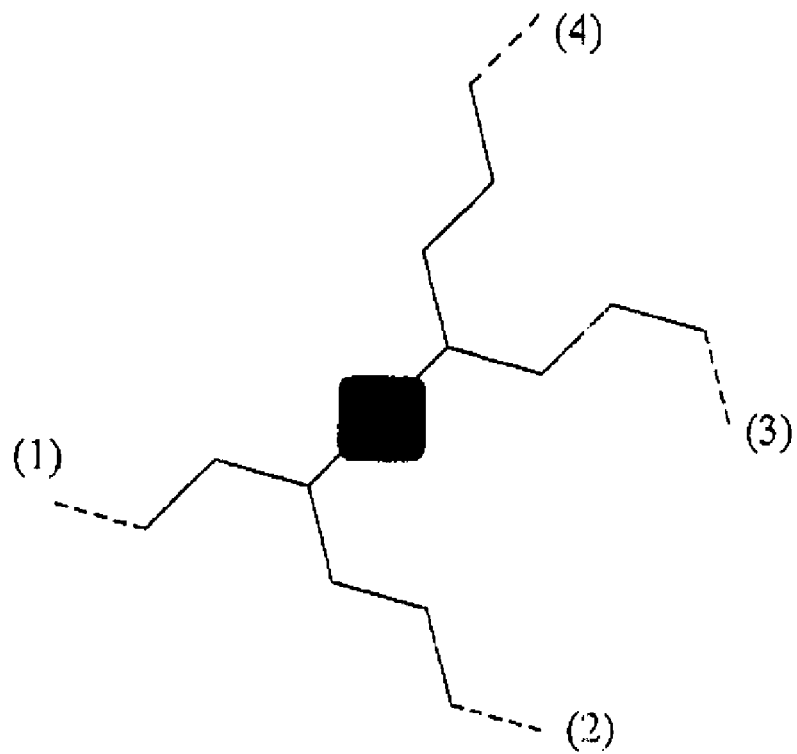
FIG. 1 illustrates a crosslink structure (prior art) with a functionality of 4, wherein (x) is the number of connected polymer strands resp. arms.
Figure 2:
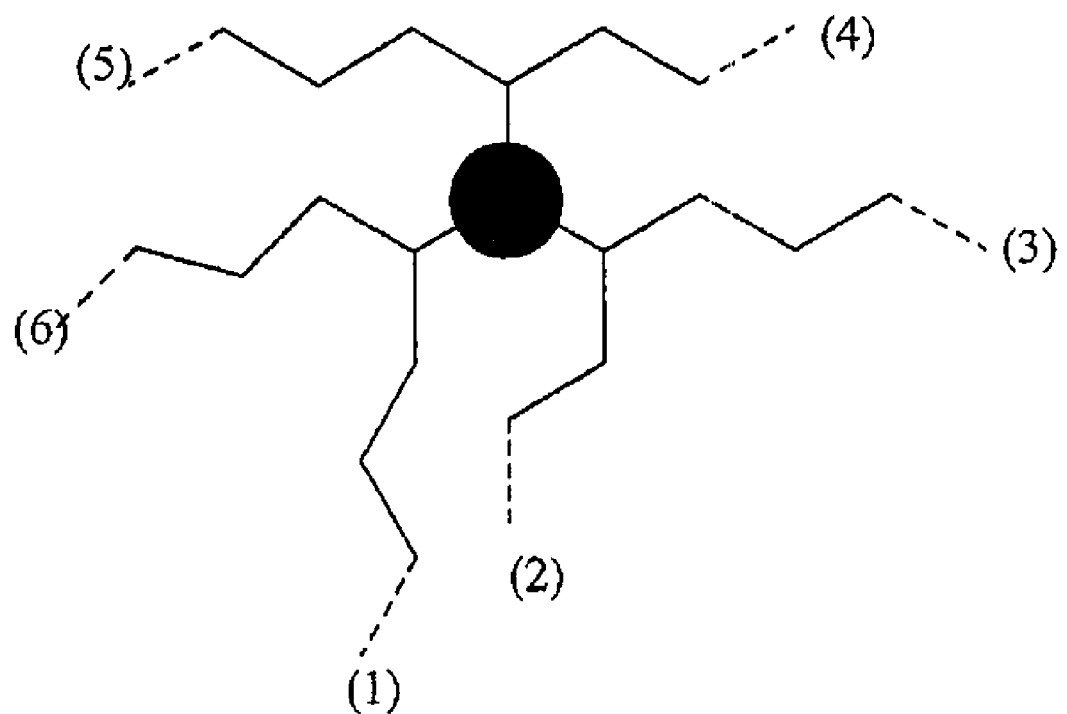
FIG. 2 illustrates a crosslink structure (invention) with a functionality of 6, wherein (x) is the number of connected polymer strands resp. arms.

Tire composition means a composition, which contains at least one vulcanizable rubber selected from natural rubbers (NR), synthetic polyisoprene rubbers (IR), polyisobutylene rubbers (PIB), polybutadiene rubbers (BR), and random styrene-butadiene rubbers (SBR, S-SBR, E-SBR) and which contains active fillers selected from carbon blacks, silicas, silicon based fillers, and metal oxides present in a combined amount of at least 35 phr (parts by weight per hundred parts by weight of total vulcanizable rubber), of which at least 10 phr must be carbon blacks, silicas, or some combination thereof. These compositions have a Shore A hardness, according to DIN 53 505 and ASTM D2240, of not less than 40 and not greater than 95 and a glass-transition temperature $T_g$ (E"max), according to DIN 53 513 with a specified temperature sweep of $-80°$ C. to $+80°$ C. and a specified compression of $10+0.2\%$ at 10 Hz, not less than $-80°$ C. and not greater than $0°$ C.

These compositions are preferably used for building and develop tire components and/or tires.

This above-mentioned object is achieved by providing a tire composition with the following composition:

A tire composition with a Shore A hardness, according to DIN 53 505 and ASTM D2240, of not less than 40 and not greater than 95 and a glass-transition temperature $T_g$ (E"max), according to DIN 53 513 with a specified temperature sweep of $-80°$ C. to $+80°$ C. and a specified compression of $10+0.2\%$ at 10 Hz, not less than $-80°$ C. and not greater than $0°$ C., having the composition comprising:

of at least one vulcanizable diene rubber selected from natural rubbers, synthetic polyisoprene rubbers, polyisobutylene rubbers, polybutadiene rubbers (BR), and random styrene-butadiene rubbers;

from 35 to 300 phr of at least one active filler selected from carbon blacks, silicas, silicon based fillers, and metal oxides, of which at least 10 phr must be carbon black, silica, or some combination thereof;

from 0 to 250 phr of other or further additives;

from $0.1 \cdot 10^{-3}$ to $42 \cdot 10^{-3}$ mhr (mol per hundred parts of rubber) of a vulcanizing agent which crosslinks with a functionality>4; and from 0.1 to 10 phr of at least one vulcanization accelerator.

Preferably, the tire composition comprises from 30 to 100 phr of at least one diene rubber.

Preferably, the vulcanizing agent comprises structures of chemical nature of hydrocarbons or siloxanes.

More preferably, the vulcanizing agent comprises a sulfur-containing structure of the general formula:

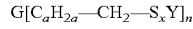

wherein G is a polyvalent cyclic hydrocarbon group and/or polyvalent heterohydrocarbon group and/or polyvalent siloxane group containing 1 to 100 atoms; each occurrence of Y is independently selected from a rubber active group; and each occurrence of subscripts a, x and n are integers independently given by a is 0 to 6; x is 0 to 8; and n is 3 to 5.

Preferably, vulcanizing agent comprises a sulfur-containing cyclic structure of the general formula:

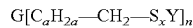

wherein G is a polyvalent cyclic hydrocarbylene group and/or polyvalent cyclic heterohydrocarbon group and/or polyvalent cyclic siloxane containing 1 to 30 atoms in the cyclic structure; each occurrence of Y is independently selected from a rubber active group comprising sulfur containing functionalities; and each occurrence of subscripts a, x and n are integers independently given by a is 0 to 6; x is 0 to 8; and n is 3 to 5. In a preferred embodiment G is a polyvalent cyclic hydrocarbylene group which contains 5 to 7 carbon atoms and each occurrence of Y is independently selected from a rubber active group comprising sulfur containing functionalities and each occurrence of subscripts a, x and n are integers independently given by a is 0 to 6; x is 0 to 8; and n is 3 to 5.

More preferably, the vulcanizing agent comprises a sulfur-containing cyclic aliphatic hydrocarbon of the general formula:

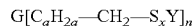

wherein G is a polyvalent cyclic hydrocarbylene group containing 5 to 7 carbon atoms; each occurrence of Y is independently selected from a thiosulfonate group, a dithiocarbamate group, a thiocarbonyl group, a mercapto group, a hydrocarbon group and a sodium thiosulfonate group (Bunte salt group); and each occurrence of subscripts a, x and n are integers independently given by a is 0 to 6; x is 0 to 8; and n is 3 to 5. In a preferred embodiment Y is independently selected from a thiosulfonate group or a dithiocarbamate group.

In a preferred embodiment, the vulcanizing agent of the tire composition comprises a crosslinked polysulfide-containing cycloaliphatic compound of the general formula:

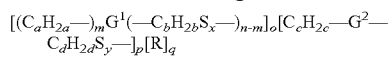

wherein $G^1$ is a saturated, monocyclic aliphatic group of valence n containing from 5 to 12 carbon atoms and optionally containing at least one halogen; $G^2$ is a saturated, divalent cyclic aliphatic group of valence 2 containing from 5 to 12 carbon atoms and optionally containing at least one halogen; each R independently is a selected from the group consisting of a hydrogen atom, monovalent hydrocarbon of up to 20 carbon atoms and a halogen atom; each occurrence of subscripts a, b, c, d, m, n, o, p, q, x and y independently is an integer wherein a is 2 to 6; b is 2 to 6; c is 1 to 6; d is 1 to 6; m is 1 or 2; n is 3 to 5; o is a positive integer, p is 0 or a positive integer; q is a positive integer; x is 1 to 10 and y is 1 to 10, with the provisos that, (i) at least one x is 2 to 10;
(ii) the ratio of p to o is less than 1 to 5; and
(iii) q is equal to the sum of unfilled valences of the $(C_aH_{2a}-)_mG^1(-C_bH_{2b}S_x-)_{n-m}$ and $C_cH_{2c}-G^2-C_dH_{2d}S_y-$ groups.

Another preferred embodiment is existent if the vulcanizing agent comprises a sulfur-containing structure of the general formula or mixtures thereof:

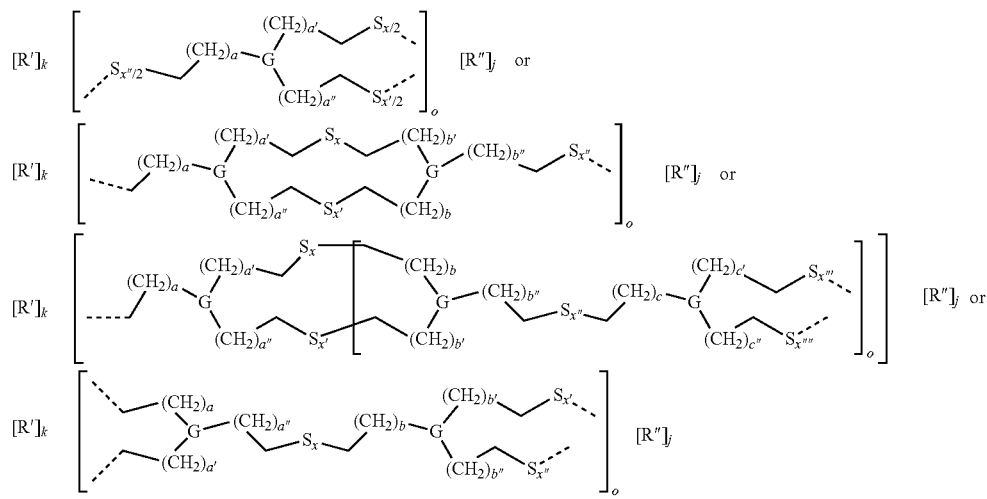

wherein G is a polyvalent hydrocarbon and/or heterohydrocarbon and/or siloxane group containing 1 to 100 atoms; and each occurrence of subscripts a, a', a'', b, b', b'', c, c', c'' k, j, o, x, x', x'', x''', and x'''' are integers independently given by a, a', a'', b, b', b'', c, c', c'' are 0 to 8; o, k, j are positive integers; and x, x', x'', x''', x'''' are 2 to 8; wherein each R', R'' is independently selected from the group consisting of a hydrogen atom, a monovalent hydrocarbon of up to 20 carbon atoms and a halogen atom.

In a preferred embodiment G is a cyclic polyvalent hydrocarbon and/or heterohydrocarbon and/or siloxane group containing 1 to 30 atoms in the cyclic structure; and each occurrence of subscripts a, a', a'', b, b', b'', c, c', c'', k, j, o, x, x', x'', x''', and x'''' are integers independently given by a, a', a'', b, b', b'', c, c', c'' are 0 to 8; o, k, j are positive integers; and x, x', x'', x''', x'''' are 2 to 8; wherein each R', R'' is independently selected from the group consisting of a hydrogen atom, a monovalent hydrocarbon of up to 20 carbon atoms and a halogen atom. In a special preferred embodiment G is a polyvalent cyclic hydrocarbylene group containing 5 to 7 carbon atoms; and each occurrence of subscripts a, a', a'', b, b', b'', c, c', c'', k, j, o, x, x', x'', x''', and x'''' are integers independently given by a, a', a'', b, b', b'' are 0 to 8; o, k, j are positive integers; and x, x', x'', x''', x'''' are 2 to 8; wherein each R', R'' is independently selected from the group consisting of a hydrogen atom, a monovalent hydrocarbon of up to 20 carbon atoms and a halogen atom.

Preferably the vulcanizing agent comprises

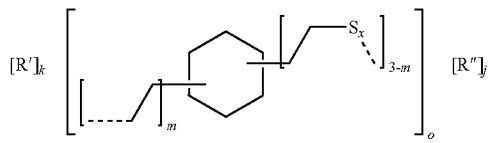

wherein each occurrence of subscripts n, o, k, j and x are integers independently given by m is 0 to 2; o, k, j are positive integers; and x is 2 to 8; wherein each R', R'' is independently selected from the group consisting of a hydrogen atom, a monovalent hydrocarbon of up to 20 carbon atoms and a halogen atom.

Preferably, the vulcanizing agent comprises

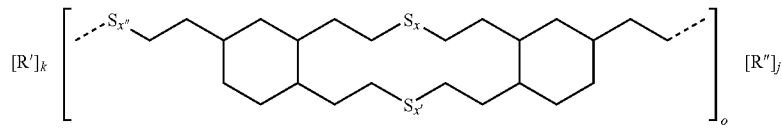

wherein each occurrence of subscripts k, o, j, x, x' and x'' are integers independently given by x, x', x'' are 2 to 8; o, k, and j are positive integers; wherein each R', R'' is independently selected from the group consisting of a hydrogen atom, a monovalent hydrocarbon of up to 20 carbon atoms and a halogen atom.

The vulcanizing agent comprises

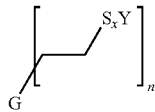

wherein G is a cyclic structure and each occurrence of Y is independently selected from a rubber active group; and each occurrence of subscripts x and n are integers independently given by x is 0 to 8 and n is 3 to 8.

More preferably the vulcanizing agent comprises

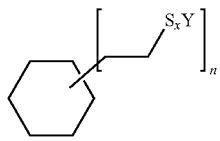

wherein each occurrence of Y is independently selected from a rubber active group; and each occurrence of subscripts x and n are integers independently given by x is 0 to 8 and n is 3 to 6. In a preferred embodiment, the rubber active group is a rubber active group which comprises sulfur containing functionalities. This rubber active group comprising sulfur containing functionalities can be selected from a thiosulfonate group, a dithiocarbamate group, a thiocarbonyl group, a hydrogen group and a hydrocarbon group, but are not restricted to these, whereas a dithiocarbamate group or a thiosulfonate group are specially preferred.

It is preferred if the vulcanizing agent comprises

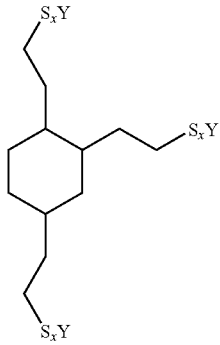

wherein each occurrence of Y is independently selected from a rubber active group; and each occurrence of subscripts x are integers independently given by x is 0 to 8.

Preferably, the vulcanizing agent comprises

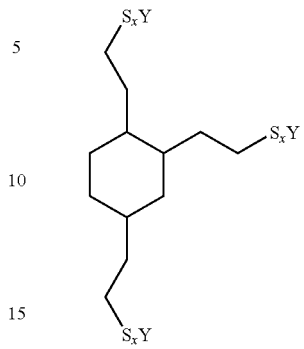

wherein each occurrence of Y is independently selected from a rubber active group comprising sulfur containing functionalities; and each occurrence of subscripts x are integers independently given by x is 0 to 8. The sulfur containing rubber active group Y is preferred to be selected from a thiosulfonate group, a dithiocarbamate group, a thiocarbonyl group, a hydrogen group and a hydrocarbon group, but are not restricted to these, wherein thiosulfonate group and dithiocarbamate group are preferred mostly.

The person skilled in the art knows about the processes to prepare the vulcanizing agent. Nevertheless some processes are shortly summarized below, although there are other processes possible to prepare the vulcanizing agent:

The process to prepare a polysulfide-containing cycloaliphatic vulcanizing agent comprises the following steps:
  a) reacting poly-alkenyl-substituted cycloalkane with thio-acid in the presence of a free-radical source to provide poly-thiocarboxylate-substituted alkylcycloalkane;
  b) reacting poly-thiocarboxylate-substituted alkylcycloalkane with deblocking agent to form free poly-mercaptan-functional alkylcycloalkane;
  c) reacting free poly-mercaptan-functional alkylcycloalkane with an oxidizing agent selected from halogenated sulfur-containing compound represented by the general formula:

$$X^1S_zX^2 \qquad (2)$$

wherein $X^1$ is chlorine, bromine or iodine atom, $X^2$ is $X^1$, hydrogen or a hydrocarbon of up to 12 carbon atoms, and z independently an integer wherein z is 1 to 10; peroxides; hydroperoxides; and oxygen,
to provide crosslinked polysulfide-containing cycloaliphatic vulcanizing agent.

A mercaptan-containing cycloaliphatic vulcanizing agent is prepared by the process which comprises:
  a) reacting poly-alkenyl-substituted cycloalkane with thio-acid in the presence of a free-radical source to provide poly-thiocarboxylate-substituted alkylcycloalkane; and
  b) reacting poly-thiocarboxylate-substituted alkylcycloalkane with deblocking agent to form free poly-mercaptan-functional alkylcycloalkane.

Another process to prepare sulfur-containing cycloaliphatic vulcanizing agent comprises the following steps:
  a) reacting poly-alkenyl-substituted cycloalkane with thio-acid in the presence of a free-radical source to provide poly-thiocarboxylate-substituted alkylcycloalkane;
  b) reacting poly-thiocarboxylate-substituted alkylcycloalkane with deblocking agent to form free poly-mercaptan-functional alkylcycloalkane;

c) reacting free poly-mercaptan-functional alkylcycloalkane with halogenating agent to provide poly-sulfenyl halide-functional cycloalkane; and, d) reacting poly-sulfenyl halide-functional alkylcycloalkane with alkali metal salt represented by the formula, R—S($=$O)$_b{}^-$M$^+$, wherein R is a monovalent hydrocarbon of up to 20 carbon atoms; M$^+$ is an alkali metal cation; and the subscript b is an integer 1 or 2, to yield the sulfur-containing cycloaliphatic compound;

or d) reacting poly-sulfenyl halide-functional alkylcycloalkane with alkali metal salt represented by the formula, R$_2$NC($=$S)S$^-$M$^+$, wherein R is a monovalent hydrocarbon of up to 20 carbon atoms; and M$^+$ is an alkali metal cation, to yield the thiocarbamoyldisulfanyl-functional cycloaliphatic compound.

The tire composition of the invention further comprises additional features: wherein fillers comprises silica, other metal oxides, metal salts (e. g., like carbonates, sulfates, . . . ), microgels or carbon black;

wherein unsaturated elastomers comprises functionalised or non-functionalised types of SBR, BR, NR, IR, SIR, SIBR, IBR, SSBR, ESBR, IIR, HIIR, EPDM, NBR or mixtures thereof; and wherein further additives comprises softeners.

The tire composition of the invention includes softeners comprising mineral oils, vegetable oils, esters, low M$_w$-polymers, biomass-to-liquid-oils or blends thereof.

It is also advantageous to include zinc oxide and stearic acid as vulcanization activators.

The phr data (parts per hundred parts of rubber by weight) used in this specification are the usual quantitative data for mixing formulations in the rubber industry. The number of parts by weight added of the individual substances here is always based on 100 parts by weight of the entire weight of all of the rubbers present in the mixture.

By adding the crosslinking building block with functionality >4 in the inventive manner, a surprisingly good durability performance can be achieved. Indeed the result is an improvement in the durability value, while other physical properties remain at the same level.

This permits decoupling of the conflicting objectives of, for example, rolling resistance and durability. This applies not only to the tread but also to other tire components, e.g. the side wall. The umbrella terms body compounds or body mixtures are also used below for the tire compositions for the other tire components, as is conventional in tire technology.

At least one diene rubber has been selected from the group consisting of natural polyisoprene and/or synthetic polyisoprene and/or polybutadiene and/or styrene-butadiene copolymer and/or solution-polymerized styrene-butadiene copolymer and/or emulsion-polymerized styrene-butadiene copolymer and/or butadiene-isoprene copolymer and/or styrene-isoprene-butadiene terpolymer and/or butyl rubber and/or halobutyl rubber. The polymers can be unfunctionalized or functionalized, also mixtures of functionalized and unfunctionalized polymers are possible.

Different applications in tires (tread/body, pass car/truck tire) are connected with different preferred polymer compositions:

-Passenger Car (PC) Tread:
The tire composition preferably comprises at least one styrene-butadiene rubber (SBR, preferably a solution-polymerized styrene-butadiene rubber (SSBR)).

Truck Tread:
The tire composition preferably comprises 40 to 100 phr natural rubber, 0 to 50 phr butadiene rubber, 0 to 60 phr SBR, preferably solution SBR Body:
The tire composition preferably comprises 20 to 100 phr natural rubber, 0 to 80 phr butadiene rubber, 0 to 50 phr SBR Fillers may be mentioned here as a separate constituent of the additives. The quantitative proportion of the fillers comprises from 35 to 150 phr of at least one active filler known like amorphous silica, other mineral fillers, or modified polymer microgels like Nanoprene (LanXess) or carbon black.

If amorphous silica is used as the major filler ingredient, this has a conventional specific surface area between 100 to 300 m$^2$/g measured as BET Surface (Nitrogen adsorption), preferred 120 to 250, and more preferred 140 to 220. If carbon black is used as the major filler ingredient, its iodine absorption number is from 25 to 300 g/kg, preferred 70 to 200 for tread applications, 40 to 90 for body applications, and its DBP number is from 50 to 300 cm$^3$/100 g preferred 70 to 150 cm$^3$/100 g. However, a combination composed of amorphous silica with the properties mentioned and carbon black with the properties mentioned can also be used as the main two filler ingredients.

For different applications are different preferred total loadings for the filler as well: PC tread 50 to 200 phr, preferred 60 to 150 phr; Truck Tread 40 to 70 phr, preferred 40 to 65 phr; Body: preferred 35 to 80 phr.

The tire composition can optionally also include, along with silica and/or carbon black, other fillers, such as aluminum hydroxide, phyllosilicates, chalk, starch, magnesium oxide, titanium dioxide, rubber gels, short fibers, etc., in any desired combination.

If any silica is used, it could be activated with organosilanes as they are used in the rubber industry.

Examples, but not limited to these, are TESPD, TESPT, or given in U.S. patent application Ser. No. 11/617,683, U.S. Ser. Nos. 11/617,649, 11/617,663, 11/617,653 or NXT, NXT low VOC, NXT-Z types by MPM (Momentive Performance Materials) as described in US 2006/0161015 or WO 2008/003514.

The mixture can optionally also include sulfur donors comprise curing agents donating sulfur to the network as they are known by persons skilled in the art or described e.g., in Hofmann & Gupta: Handbuch der Kautschuktechnologie, Gupta-Verlag (2001), chapter 7, like Thiuramdisulfide, preferred TBzTD, or Dithiophosphates like DipDis (bis (diisopropyl) thiophosphoryl Disulphide), SDT (e. g. Rhenocure SDT 50, Rheinchemie GmbH), Zincalkyl-dithiophosphate (ZDT) (e.g. Rhenocure ZDT/S, Rheinchemie GmbH).

The quantitative proportion of the entire amount of vulcanization accelerator is as follows.

There are from 0.1 to 20 phr of at least one vulcanization accelerator and preferably from 0.1 to 15 phr, of the at least one vulcanization accelerator, which is selected from the group comprising thiazole accelerators, mercapto accelerators, sulfenamide accelerators, guanidine accelerators, thiuram accelerators, dithiocarbamate accelerators, amine accelerators, thioureas, and/or other accelerators, which are known by person skilled in the art.

The quantitative proportion of the vulcanization accelerator is preferably from 0.1 to 6 phr, and preferably at least one accelerator here is selected from the groups of the sulfenamide accelerators, preferably to use N-tert-butyl-2-benzothiazolesulfenamide (TBBS), or cyclohexylbenzothiazolesulfenamide (CBS).

The usual total quantitative proportion of the further or other additives is from 10 to 220 phr, and preferably 10 to 200 phr. The additives comprise e.g. the vulcanization aids other than accelerators, sulfur donors and sulfur known by persons skilled in the art like, e.g., ZnO, stearic acid, resins etc. Other additives include one or more processing aids, one or more plasticizers, one or more antiozonants, and one or more antioxidants. Further additives well known in rubber-mixing technology can also be added, if appropriate. The other and further additives may range from 10 to 220 phr, as stated above.

The additives moreover comprise from 0 to 120 phr of at least one plasticizer oil, the plasticizer oil being e.g. a mineral oil selected from the group comprising of DAE (Distillated Aromatic Extracts) and/or RAE (Residual Aromatic Extract) and/or TDAE (Treated Distillated Aromatic Extracts) and/or MES (Mild Extracted Solvents) and/or naphthenic oils.

From 0 to 80 phr of at least one other additional plasticizer can also be present in the tire composition. This other plasticizer can be a synthetic plasticizer and/or a fatty acid and/or a fatty acid derivative and/or a resin and/or a factice and/or a low molecular weight polymer and/or a vegetable oil and/or mineral oils and/or esters and/or biomass-to-liquid-oils and/or blends thereof.

The tire composition of the invention is preferably used for the production of a tire. This can be a solid rubber tire, or a pneumatic tire. A particularly important application here is the use in the tread of a pneumatic tire and in a body mixture for a pneumatic tire. The expression body mixture here includes side wall, inner liner, apex, belt, shoulder, belt profile, squeegee, carcass, and/or bead reinforcement but is not restricted to these.

The following is based upon the different compositions containing different ingredients which illustrate several specific preferred ranges depending on the class of silane and compound application as examples:

Further Additional Features:
1. Sulfur donors are thiuram disulfides or thiophosphates, preferred TBzTD or SDT or DipDis or ZDT.
2. Silanes, if used, are TESPT or TESPD or NXT-type silanes or SI363 type silanes or NXT-Z-type silanes or NXT low VOC type silanes or silated core silanes.
3. Unsaturated elastomers comprises SBR, BR, NR, IR, SIR, SIBR, IBR, EPDM, or mixtures thereof.
4. 4. Softener comprises mineral oils, vegetable oils, biomass-to-liquid oils, esters, low Mw-polymers, or blends thereof.

Quantitative Composition:
30-100 phr unsaturated rubber (e.g. for pass car tread: SBR/BR 0-50 phr; NR 0-50 phr, preferably 0-30 phr, preferably 0-20 phr);
all fillers can be used 35-200 phr, preferably 40-150 phr, (cb, silica, etc . . . );
0-120 phr softener, preferably 0-90 phr, preferably 0-80 phr,
0-60 phr additional ingredients, preferably 0-40 phr (ozone protection waxes, resins, ZnO, anti-aging preservatives, etc).

The invention tire compositions are useful for producing tires, tire tread and tire body compounds. The invention tire compositions are also useful for producing technical rubber goods, such as a hose, an air spring, damping elements, and/or a power transmission belt.

As an example the following mixing procedure and equipment was used to obtain the described compounds, but other appropriate mixing equipment and procedures known by persons skilled in the art are possible as well. The compounds in all Examples were mixed in an instrumented "OOC" BANBURY® (Farrell Corp.) mixer with a 158 cu. in. (2,600 cc) chamber volume. The mixing of the rubber was done in three steps. The mixer was turned on with the mixer at 80 rpm and the cooling water at 71° C. The rubber polymers were added to the mixer and ram down mixed for 30 seconds. The fillers and the silane, if used, were added to the mixer and ram down mixed for 30 seconds. The other ingredients in the Masterbatch of Table 1 except for the oils were added to the mixer and ram down mixed for 60 seconds. The mixer speed was reduced to 65 rpm and then the oils of the Masterbatch were added to the mixer and ram down mixed for 60 seconds. The mixer throat was dusted down and the ingredients ram down mixed until the temperature reached 150° C. The ingredients were then mixed for an additional 3 minutes and 30 seconds. The mixer speed was adjusted to hold the temperature between 150 and 155° C. The rubber was dumped (removed from the mixer), a sheet was formed on a roll mill set at about 85° to 90° C., and then allowed to cool to ambient temperature.

In the second step, the Masterbatch was recharged into the mixer. The mixer's speed was 80 rpm, the cooling water was set at 71° C. and the ram pressure was set at 25 psi. The Masterbatch was ram down mixed for 150 seconds while the temperature of the Masterbatch was brought up to 150° C., and then the mixer's speed was reduced to 50 rpm. The rubber was mixed for 40 seconds at temperatures between 150 and 155° C. After mixing, the rubber was dumped (removed from the mixer) and a sheet was formed on a roll mill set at about 85° to 90° C. The rubber was allowed to cool to ambient temperature.

In the third step, the mixer's speed was set to 50 rpm, the cooling water was set at 71° C. and the ram pressure was set at 25 psi. The rubber Masterbatch and the curatives were ram down mixed for 190 seconds while the temperature of the Final Mix was brought up to 115° C. After mixing, the rubber was dumped (removed from the mixer), a sheet was formed on a roll mill set at about 85° to 90° C., and then allowed to cool to ambient temperature. The curing condition was 160° C. for 20 minutes. The test procedures were described in the following ASTM/DIN methods:

| | |
|---|---|
| Mooney Scorch | ASTM D1646 |
| Mooney Viscosity | ASTM D1646 |
| Rheometer (MDR 2000) | DIN 53529 |
| Storage Modulus, Loss Modulus | DIN 53513 |
| Tensile and Elongation | DIN 53504-R1 |
| Shore A Hardness | DIN 53505 |
| Rebound | DIN 53512, ASTM D1054 |
| DIN Abrasion | DIN 53516 |

Detailed Description of Preferred Embodiments

The invention will now be explained in more detail using a comparative example and inventive examples, collated in the following table.

Table 1 shows the composition of the mixture, and also shows the associated laboratory test results, as well as showing the test results obtained directly on a tire.

Tire composition C1 is a comparative mixture containing only sulfur, while tire compositions E1 were vulcanized inventively with sulfur and with the addition of the vulcanizing agent of the present invention.

In all of the mixture examples shown in the table, the quantitative-proportion data are parts by weight, based on 100 parts by weight of total rubber.

Preparation of the laboratory mixture took place in a tangential laboratory mixer. All of the mixtures were used to produce test specimens via vulcanization, these being produced under the vulcanization conditions known to the person skilled in the art, and these test specimens were used to determine the typical rubber-industry properties of the materials. The test specimens were tested by the following test methods:

Shore A hardness at room temperature and 70° C. to DIN 53 505 rebound elasticity at room temperature and 70° C. to DIN 53 512 tensile strength at room temperature to DIN 53 504 elongation at break at room temperature to DIN 53 504 stress values for 300% static elongation at room temperature to DIN 53 504 abrasion values to DIN 53 516 abrasion after Grosch to Grosch, K. A., the 131th ACS Rubber Div. Meeting, No. 97 (1987) and Grosch, K. A. et al., Kautschuk Gummi Kunststoffe, 50, 841 (1997)

tear propagation resistance after Graves at room temperature to DIN 53 515 fatigue resistance as number of load changes up to the break of a dumbbell-shaped sample under constantly repeating strain cycle with a frequency of $104\pm8$ min$^{-1}$, determined with a Monsanto Fatigue to Failure tester (FTF) at 136% strain and 60° C.

High speed tear energy (HSTE) to DIN 53 448 or ASTM D 624-86

Life time analysis (LTA) with 30% strain

Pneumatic tires of 205/55/R16 size were produced with a tread composed of the mixtures listed in Table 1, and the tires were used for trials of wet-braking on asphalt (low μ) and concrete (high μ), and also of aquaplaning, and also of rolling resistance. Abrasion was also measured. The properties of the tire using mixture C1 were set at 100, and values greater than 100 for the mixture E1 denote an improvement in the corresponding property. The results of the trials are shown in Table 1.

It was found that the comparative mixture C1, which was vulcanized with conventional addition of elemental sulfur, exhibits about 15% higher abrasion (DIN abrasion) in the laboratory results, see Table 1, and its abrasion property is therefore substantially poorer. This tendency is also apparent in the corresponding tire trials, see Table 1. Other physical properties remain at approximately the same level only in the laboratory, see Table 1, but also in the tire trial, see Table 1.

If abrasion is given as lab data in absolute (mm$^3$) figures it is representing the weight loss during the test meaning that lower values denote improvement in all tables with physical data. For relative figures (%) concerning abrasion or tire properties always higher values mean better performance. Further examples in Tables 2 to 6 are given showing the application of different species representing different crosslinking agents with functionalities>4 in different tire compositions. The lab results always reflect the improvement of fatigue and/or tear and/or abrasion properties while keeping the other material properties mainly constant.

Although only a few embodiments of the present invention have been shown and described, it is to be understood that many changes and modifications may be made thereunto without departing from the spirit and scope of the invention as defined in the appended claims. The 'C' compositions are control compositions and the 'E' compositions are according to the described invention.

TABLE 1

Improvement in fatigue, tear, and abrasion/wear for pass car tread over control and multifunctional crosslinker

| Pass Car Tread | | C 1 | E 1 |
|---|---|---|---|
| NR | | 20.000 | 20.000 |
| BR | | 35.000 | 35.000 |
| SSBR | | 45.000 | 45.000 |
| Silica | | 85.000 | 85.000 |
| Softener | | 45.000 | 45.000 |
| Antiaging | | 6.000 | 6.000 |
| ZINC OXIDE | | 2.500 | 2.500 |
| STEARIC ACID | | 2.500 | 2.500 |
| TESPT | | 6.754 | 6.754 |
| TBBS | | 1.810 | 1.810 |
| VULCUREN VP KA 9188 | | 2.544 | — |
| MFXL 1 | | — | 2.640 |
| MFXL | mhr | | 0.0027 |
| Mooney (ML1 + 4) | mooney units | 43.5 | 43.8 |
| MDR 2000 160' C. | | | |
| Time (Cure State) - 10 | min | 2.54 | 2.59 |
| Time (Cure State) - 95 | min | 15.25 | 14.42 |
| ML | dNm | 1.79 | 1.85 |
| MHF | dNm | 19.04 | 19.54 |
| MHF – ML | dNm | 17.25 | 17.69 |
| Temperature (Celsius) | | 160 | 160 |
| Curing Time (min) | | 20 | 20 |
| Crosslink distance | nm | 7.9 | 7.8 |
| Density RT | g/cm3 | 1.164 | 1.165 |
| Hardness Shore A RT | shore A | 58.6 | 58.1 |
| Resilience RT | percent | 42.5 | 42.1 |
| Resilience 70' C. | percent | 54.1 | 54.8 |
| Tensile Test RT | | | |
| Tensile Strength | MPa | 15.9 | 15.3 |
| Tear Elongation | percent | 550 | 558 |
| Stress (Elongation) - 50 | MPa | 1.02 | 1.09 |
| Stress (Elongation) - 100 | MPa | 1.85 | 1.83 |
| Stress (Elongation) - 200 | MPa | 4.3 | 4.24 |
| Stress (Elongation) - 300 | MPa | 7.58 | 7.44 |
| Grosch Abrasion | % | 100 | 109 |
| Abrasion DIN53516 RT | mm3 | 49.23 | 42.9 |
| LTA RT Monsanto | | | |
| Applied strain | percent | 30 | 30 |
| Cycle (median) | kC | 29.4 | 33 |
| Variation coefficient | % | 8.1 | 8.6 |
| Tg (E") | ° C. | -52 | -52 |
| Tire Test*) | | | |
| Shore A RT | | 58.1 | 59 |
| ABS wet braking (low μ) | % | 100 | 102 |
| ABS wet braking (high μ) | % | 100 | 99.9 |
| dry braking | % | 100 | 100 |
| dry handling | % | 100 | 100.6 |
| Aquaplaning | % | 100 | 100 |
| traction on snow | % | 100 | 98 |
| artificial ice | % | 100 | 98.5 |
| rolling resistance | % | 100 | 99 |
| wear | % | 100 | 108 |

*)higher values mean better performance

TABLE 2

Improvement in fatigue, tear and abrasion/wear for truck tread over control and multifunctional crosslinker Truck Tread

|  |  | C 2 | C 3 C6-T2 | E 2 MFXL |
|---|---|---|---|---|
| NR | phr | 100.000 | 100.000 | 100.000 |
| N 220 | phr | 43.500 | 43.500 | 43.500 |
| Antiaging | phr | 6.000 | 6.000 | 6.000 |
| ZINC OXIDE INDIRECT | phr | 3.000 | 3.000 | 3.000 |
| STEARIC ACID | phr | 2.000 | 2.000 | 2.000 |
| TBBS | phr | 1.100 | 1.100 | 1.100 |
| SULFUR | phr | 1.800 | 1.602 | 1.100 |
| C6-T2 |  | — | 0.946 | — |
| MFXL 2 | phr | — | — | 2.780 |
|  | mhr |  |  | 0.00382 |
| Mooney ML (1 + 4) 100' C. |  |  |  |  |
| Mooney (ML1 + 4) | mooney units | 60 | 59.3 | 60.3 |
| MDR 2000 160' C. |  |  |  |  |
| Time (Cure State) - 10 | min | 2.41 | 2.2 | 2.28 |
| Time (Cure State) - 95 | min | 5.92 | 6.05 | 7.6 |
| ML | dNm | 2.52 | 2.53 | 2.67 |
| MHF | dNm | 15.15 | 16.1 | 15.12 |
| MHF – ML | dNm | 12.63 | 13.57 | 12.45 |
| Density RT | g/cm3 | 1.09 | 1.09 | 1.09 |
| Hardness Shore A RT | shore A | 56.9 | 59.5 | 60.9 |
| Hardness Shore A 70' C. | shore A | 51.6 | 55.3 | 54.6 |
| Resilience RT | percent | 45.7 | 46.8 | 43.6 |
| Resilience 70' C. | percent | 56.9 | 57.9 | 52.4 |
| Tensile Test RT |  |  |  |  |
| Tensile Strength | MPa | 20.9 | 23.3 | 21.7 |
| Elongation at Break | percent | 559 | 562 | 571 |
| Stress (Elongation) - 50 | MPa | 0.96 | 1.1 | 1.07 |
| Stress (Elongation) - 300 | MPa | 8.87 | 10.16 | 9.02 |
| Break Energy Density | J/cm3 | 42.2 | 48.5 | 45.3 |
| HSTE | MJ/m3 | 10.13 | 9.18 | 13.03 |
| Graves 100' C. Tear Resistance | N/mm | 60.02 | 60.52 | 73.20 |
| Epl. Temp Sweep 50/30N T (E''max) | Celsius | −61.3 | −61.2 | −61.2 |

TABLE 3

Improvement in fatigue, tear, and/or abrasion/wear for body compound (belt skim) over control and multifunctional crosslinker

| Belt Skim |  | C 4 | E 3 | E 4 | E 5 |
|---|---|---|---|---|---|
| NR | phr | 80.000 | 80.000 | 80.000 | 80.000 |
| BR | phr | 20.000 | 20.000 | 20.000 | 20.000 |
| Silica | phr | 56.500 | 56.500 | 56.500 | 56.500 |
| Resins | phr | 7.500 | 7.500 | 7.500 | 7.500 |
| Anti-Aging | phr | 3.750 | 3.750 | 3.750 | 3.750 |
| Co-Salt | phr | 0.360 | 0.360 | 0.360 | 0.360 |
| Processing Aid | phr | 1.500 | 1.500 | 1.500 | 1.500 |
| ZnO | phr | 8.000 | 8.000 | 8.000 | 8.000 |
| TESPT | phr | 8.500 | 8.500 | 8.500 | 8.500 |
| N 339 | phr | 2.000 | 2.000 | 2.000 | 2.000 |
| HMMM RESIN 65% | phr | 3.850 | 3.850 | 3.850 | 3.850 |
| DCBS | phr | 1.600 | 1.600 | 1.600 | 1.600 |
| INSOL. SULFUR OT 33 | phr | 6.000 | 5.700 | 5.100 | 3.600 |
| MFXL 3 | mhr |  | 0.00190 | 0.00380 | 0.00760 |
|  | phr | — | 0.680 | 1.360 | 2.720 |
| Mooney (ML1 + 4) | mooney units | 90.6 | 91.2 | 92.7 | 89.8 |
| MDR 2000 160' C. |  |  |  |  |  |
| Time (Cure State) - 10 | min | 0.93 | 0.84 | 0.83 | 0.83 |
| Time (Cure State) - 95 | min | 15.55 | 14.45 | 13.86 | 13.95 |
| ML | dNm | 3.7 | 3.84 | 3.84 | 3.71 |
| MHF | dNm | 37.68 | 38.64 | 36.83 | 31.38 |
| MHF – ML | dNm | 33.98 | 34.8 | 32.99 | 27.67 |
| Density RT | g/cm3 | 1.21 | 1.211 | 1.211 | 1.204 |
| Hardness Shore A RT | shore A | 78 | 79.8 | 78.65 | 75.9 |
| Hardness Shore A 70' C. | shore A | 75.1 | 76.65 | 77.05 | 72.9 |
| Resilience RT | percent | 43.9 | 44.7 | 44 | 42.5 |
| Resilience 70' C. | percent | 55.3 | 56.9 | 55.1 | 52.9 |
| Tensile Test (R1) RT |  |  |  |  |  |
| Tensile Strength | MPa | 18.5 | 18.2 | 15.5 | 19.0 |
| Elongation at Break | percent | 412 | 408 | 363 | 477 |
| Stress (Elongation) - 50 | MPa | 2.2 | 2.3 | 2.3 | 1.9 |
| Stress (Elongation) - 300 | MPa | 14.1 | 14.2 | 13.8 | 12.1 |
| Graves 100' C. Tear | N/mm | 51.1 | 56.2 | 62.2 | 57.3 |

TABLE 4

Improvement in fatigue and tear and abrasion/wear for body compound (belt skim) over control and multifunctional crosslinker

| Belt Skim | | C 5 | E 6 | E 7 | E 8 |
|---|---|---|---|---|---|
| NR | phr | 100.000 | 100.000 | 100.000 | 100.000 |
| N326 | phr | 55.000 | 55.000 | 55.000 | 55.000 |
| Silica | phr | 9.800 | 9.800 | 9.800 | 9.800 |
| Resin, Softener | phr | 9.800 | 9.800 | 9.800 | 9.800 |
| AntiAging | phr | 2.500 | 2.500 | 2.500 | 2.500 |
| Co-Salt | phr | 2.000 | 2.000 | 2.000 | 2.000 |
| ZnO | phr | 8.000 | 8.000 | 8.000 | 8.000 |
| N 339 | phr | 2.000 | 2.000 | 2.000 | 2.000 |
| HMMM RESIN 65% | phr | 2.000 | 2.000 | 2.000 | 2.000 |
| DCBS | phr | 1.300 | 1.300 | 1.300 | 1.300 |
| INSOL. SULFUR | phr | 5.520 | 5.330 | 4.300 | 3.900 |
| MFXL 3 | phr | — | 0.680 | 1.360 | 2.720 |
|  | mhr |  | 0.0019 | 0.0038 | 0.0076 |
| Mooney (ML1 + 4) | mooney units | 80.2 | 80.9 | 82.3 | 82.9 |
| MDR 2000 160' C. | | | | | |
| Time (Cure State) - 10 | min | 1.59 | 1.67 | 1.73 | 1.78 |
| Time (Cure State) - 95 | min | 10.38 | 10.42 | 9.3 | 9.26 |
| ML | dNm | 3.18 | 3.19 | 3.35 | 3.43 |
| MHF | dNm | 32.08 | 31.43 | 29.16 | 28.02 |
| MHF − ML | dNm | 28.9 | 28.24 | 25.81 | 24.59 |
| Density RT | g/cm3 | 1.204 | 1.202 | 1.202 | 1.203 |
| Hardness Shore A RT | shore A | 77.5 | 76.8 | 75.1 | 75.6 |
| Hardness Shore A 70' C. | shore A | 75 | 73.7 | 71.5 | 71.35 |
| Resilience RT | percent | 39.1 | 39.3 | 38.5 | 37.6 |
| Resilience 70' C. | percent | 53.3 | 52.5 | 51.9 | 50.5 |
| Tensile Test RT | | | | | |
| Tensile Strength | MPa | 19.9 | 19.8 | 19.5 | 19.3 |
| Elongation at Break | percent | 360 | 362 | 375 | 377 |
| Stress (Elongation) - 50 | MPa | 2.7 | 2.6 | 2.5 | 2.4 |
| Stress (Elongation) - 300 | MPa | 18.2 | 18.0 | 17.0 | 16.7 |
| Break Energy Density | J/cm3 | 31.9 | 31.8 | 32.2 | 32.1 |
| Graves 100' C. Tear | N/mm | 48.95 | 53.55 | 59.28 | 63.37 |

TABLE 5

Improvement in fatigue and tear and abrasion/wear for truck tread over control and multifunctional crosslinker

| Truck Tread | | C 6 | E 9 | C 7 | E 10 | C 8 | E 11 |
|---|---|---|---|---|---|---|---|
| NR | phr | 100.000 | 100.000 | 100.000 | 100.000 | 100.000 | 100.000 |
| N121 | phr | 48.000 | 46.000 | 46.000 | 46.000 | 46.000 | 46.000 |
| Processing Aid | phr | 6.900 | 2.400 | 2.400 | 2.400 | 2.400 | 2.400 |
| Anti Aging | phr | 1.000 | 1.000 | 1.000 | 1.000 | 1.000 | 1.000 |
| Stearic Acid | phr | 2.000 | 2.000 | 2.000 | 2.000 | 2.000 | 2.000 |
| ZnO | phr | 3.000 | 3.000 | 3.000 | 3.000 | 3.000 | 3.000 |
| TBBS | phr | 0.800 | 0.800 | 1.200 | 1.200 | 2.600 | 2.600 |
| Sulfur | phr | 1.600 | 1.040 | 1.200 | 0.870 | 0.550 | 0.450 |
| MFXL 3 | phr | — | 4.078 | — | 4.078 | — | 1.359 |
|  | mhr |  | 0.0114 |  | 0.0114 |  | 0.0038 |
| MDR 2000 160' C. | | | | | | | |
| Time (Cure State) - 10 | min | 2.66 | 2 | 2.99 | 2.05 | 3.27 | 2.8 |
| Time (Cure State) - 90 | min | 6.39 | 6.64 | 6.16 | 6.72 | 8.03 | 8.38 |
| ML | dNm | 2.68 | 2.84 | 2.66 | 2.74 | 2.46 | 2.57 |
| MHF | dNm | 16.02 | 13.62 | 16.02 | 14.74 | 15.26 | 14.96 |
| MHF − ML | dNm | 13.34 | 10.78 | 13.36 | 12 | 12.8 | 12.39 |
| Density RT | g/cm3 | 1.098 | 1.101 | 1.097 | 1.099 | 1.095 | 1.096 |
| Hardness Shore A RT | shore A | 61.3 | 59.1 | 60.2 | 60.1 | 59.55 | 59.05 |
| Hardness Shore A 70' C | shore A | 56.2 | 51.75 | 55.05 | 53.25 | 53.95 | 53 |
| Resilience RT | percent | 44.6 | 42.1 | 44.6 | 42.6 | 45.7 | 44.1 |
| Resilience 70' C. | percent | 59.3 | 52.9 | 60.2 | 55.1 | 57.3 | 58 |
| Tensile Test RT | | | | | | | |
| Tensile Strength | MPa | 24.7 | 20.5 | 24.5 | 22.1 | 23.6 | 23. |
| Elongation at Break | percent | 525 | 508 | 522 | 508 | 498 | 511 |
| Stress (Elongation) - 50 | MPa | 1.17 | 1.07 | 1.14 | 1.13 | 1.05 | 1.05 |

TABLE 5-continued

Improvement in fatigue and tear and abrasion/wear for truck tread over control and multifunctional crosslinker

| Truck Tread | | C 6 | E 9 | C 7 | E 10 | C 8 | E 11 |
|---|---|---|---|---|---|---|---|
| Stress (Elongation) - 300 | MPa | 12.70 | 10.75 | 12.68 | 11.83 | 12.78 | 12.41 |
| HSTE | MJ/m3 | 7.67 | 13.38 | 7.58 | 10.33 | 7.14 | 8.5 |
| LTA RT Monsanto (Life Time Analysis) | | | | | | | |
| Applied strain | percent | 30 | 30 | 30 | 30 | 30 | 30 |
| Cycle (median) | kC | 86 | 100.3 | 68 | 78.9 | 95.5 | 106 |
| Variation coefficient | % | 15.6 | 20.2 | 14.3 | 9.9 | 4.6 | 8.7 |
| Graves 100' C. Tear Resistance | N/mm | 64.20 | 74.17 | 65.93 | 81.38 | 62.23 | 85.18 |

TABLE 6

Improvement in fatigue and tear and abrasion/wear for truck tread over control and multifunctional crosslinker (C means control)

| Truck Tread | | C 9 | E 12 | E 13 | C 10 | E 13 | C 11 | E 14 |
|---|---|---|---|---|---|---|---|---|
| NR | phr | 100.000 | 100.000 | 100.000 | 100.000 | 100.000 | 100.000 | 100.000 |
| N121 | phr | 48.000 | 48.000 | 48.000 | 48.000 | 48.000 | 48.000 | 48.000 |
| Processing Aid | phr | 2.400 | 2.400 | 2.400 | 2.400 | 2.400 | 2.400 | 2.400 |
| Anti Aging | phr | 6.000 | 1.000 | 1.000 | 1.000 | 1.000 | 1.000 | 1.000 |
| Stearic Acid | phr | 2.000 | 2.000 | 2.000 | 2.000 | 2.000 | 2.000 | 2.000 |
| ZnO | phr | 3.000 | 3.000 | 3.000 | 3.000 | 3.000 | 3.000 | 3.000 |
| TBBS | phr | 0.800 | 0.800 | 0.800 | 1.200 | 1.200 | 2.600 | 2.600 |
| SULFUR | phr | 1.600 | 1.250 | 1.250 | 1.200 | 1.080 | 0.550 | 0.460 |
| MFXL 4 | phr | — | 1.016 | 1.484 | — | 1.016 | — | 1.016 |
| | mhr | | 0.003 | 0.004 | | 0.003 | | 0.003 |
| MDR 2000 160' C. | | | | | | | | |
| Time (Cure State) - 10 | min | 2.6 | 2.85 | 2.86 | 2.97 | 3.01 | 3.25 | 3.29 |
| Time (Cure State) - 90 | min | 6.36 | 6.48 | 6.43 | 6.09 | 6.18 | 8.04 | 8.5 |
| ML | dNm | 2.77 | 2.64 | 2.61 | 2.68 | 2.54 | 2.47 | 2.4 |
| MHF | dNm | 15.98 | 14.33 | 14 | 16.05 | 15.08 | 15.31 | 13.7 |
| MHF - ML | dNm | 13.21 | 11.69 | 11.39 | 13.37 | 12.54 | 12.84 | 11.3 |
| Temperature (Celsius) | | 160 | 160 | 160 | 160 | 160 | 160 | 160 |
| Time (min) | | 10 | 10 | 10 | 10 | 10 | 15 | 15 |
| Density RT | g/cm3 | 1.099 | 1.098 | 1.098 | 1.097 | 1.097 | 1.095 | 1.095 |
| Hardness Shore A RT | shore A | 60.2 | 58.1 | 57.25 | 60.55 | 58.9 | 59.45 | 58.45 |
| Hardness Shore A 70' C. | shore A | 55.7 | 52.25 | 51.4 | 54.75 | 53.1 | 54.25 | 51.5 |
| Resilience RT | percent | 46.3 | 43.1 | 43.6 | 46.8 | 44.4 | 46.8 | 42.3 |
| Resilience 70' C. | percent | 59.1 | 56.7 | 58.2 | 60.4 | 58.3 | 59 | 55.2 |
| Tensile Test RT | | | | | | | | |
| Tensile Strength | MPa | 25.4 | 23.7 | 23.6 | 25.1 | 24.6 | 24.5 | 22.2 |
| Elongation at Break | percent | 537.3 | 556.3 | 555.6 | 527.0 | 549.2 | 517.2 | 521.0 |
| Stress (Elongation) - 50 | MPa | 1.163 | 1.007 | 0.995 | 1.14 | 1.048 | 1.058 | 0.948 |
| Stress (Elongation) - 100 | MPa | 2.067 | 1.709 | 1.688 | 2.028 | 1.814 | 1.908 | 1.62 |
| Stress (Elongation) - 200 | MPa | 6.182 | 5.092 | 5.071 | 6.264 | 5.575 | 6.184 | 5.097 |
| Stress (Elongation) - 300 | MPa | 12.6 | 10.8 | 10.7 | 12.9 | 11.6 | 12.8 | 11.0 |
| Break Energy Density | J/cm3 | 51.9 | 48.8 | 48.8 | 50.4 | 50.8 | 47.6 | 42.1 |
| Applied strain | percent | 30 | 30 | 30 | 30 | 30 | 30 | 30 |
| Cycle (median) | kC | 105.5 | 151.2 | 147.2 | 131.6 | 153.9 | 96.1 | 129.9 |
| HSTE | MJ/m3 | 7.69 | 10.64 | 10.95 | 7.53 | 9.71 | 6.79 | 10.04 |
| Tear Resistance Graves | | | | | | | | |
| 100' C. | N/mm | 61.55 | 66.48 | 73.90 | 72.32 | 76.30 | 54.02 | 57.75 |

MFXL 1→

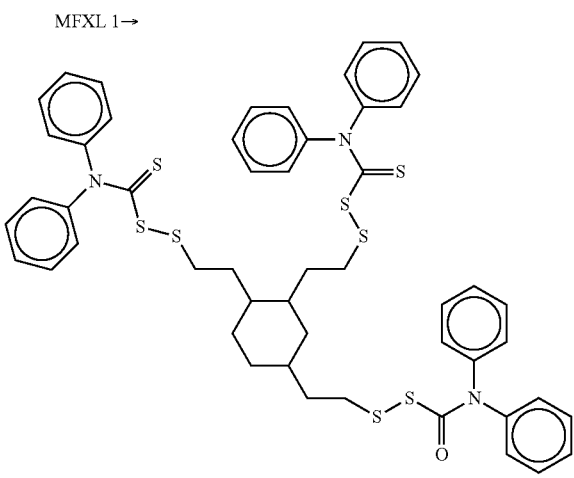

MFXL 2→

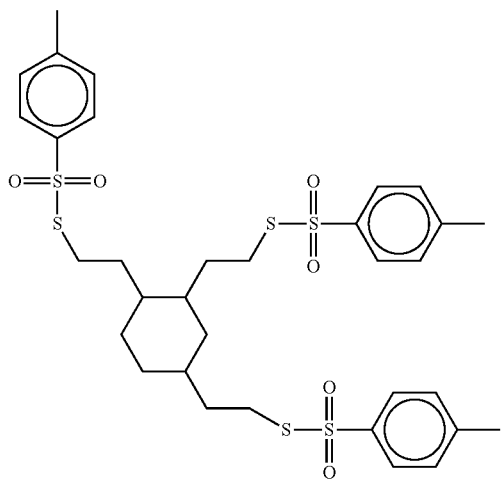

MFXL 3→

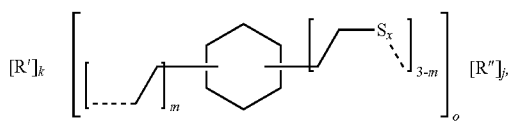

wherein m is 0 to 2, k, o, and j are positive integers.

MFLX 4→

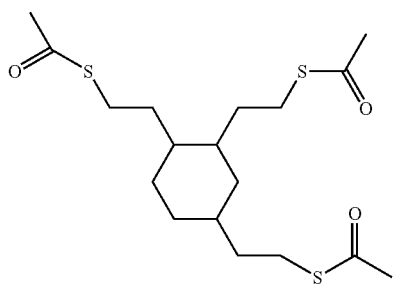

What is claimed is:

1. A tire composition with a Shore A hardness, according to DIN 53 505 and ASTM D2240, of not less than 40 and not greater than 95 and a glass-transition temperature Tg (E"max), according to DIN 53 513 with a specified temperature sweep of −80° C. to +80° C. and a specified compression of 10 +0.2% at 10 Hz, not less than −80 ° C. and not greater than 0° C., having the composition comprising:
- of at least one vulcanizable diene rubber selected from natural rubbers, synthetic polyisoprene rubbers, polyisobutylene rubbers, polybutadiene rubbers (BR), and random styrene-butadiene rubbers;
- from 35 to 300 phr of at least one active filler selected from carbon blacks, silicas, silicon based fillers, and metal oxides, of which at least 10 phr must be carbon black, silica, or some combination thereof;
- from 0 to 250 phr of other or further additives;
- from $0.1 \cdot 10^{-3}$ to $42 \cdot 10^{-3}$ mhr (mol per hundred parts of rubber) of a vulcanizing agent which crosslinks with a functionality>4; and
- from 0.1 to 10 phr of at least one vulcanization accelerator; and
- wherein the vulcanizing agent comprises a sulfur-containing structure of the general formula:

$$G[C_aH_{2a}\text{---}CH_2\text{---}S_xY]_n$$

wherein G is a polyvalent hydrocarbon group and/or heterohydrocarbon group and or siloxane group containing 1 to 100 atoms; each occurrence of Y is independently selected from a rubber active group; and each occurrence of subscripts a, x and n are integers independently given by a is 0 to 6; x is 0 to 8; and n is 2 to 8.

2. A tire composition with a Shore A hardness, according to DIN 53 505 and ASTM D2240, of not less than 40 and not greater than 95 and a glass-transition temperature Tg (E"max), according to DIN 53 513 with a specified temperature sweep of −80° C. to +80° C. and a specified compression of 10 +0.2% at 10 Hz, not less than −80° C. and not greater than 0° C., having the composition comprising:
- of at least one vulcanizable diene rubber selected from natural rubbers, synthetic polyisoprene rubbers, polyisobutylene rubbers, polybutadiene rubbers (BR), and random styrene-butadiene rubbers;
- from 35 to 300 phr of at least one active filler selected from carbon blacks, silicas, silicon based fillers, and metal oxides, of which at least 10 phr must be carbon black, silica, or some combination thereof;
- from 0 to 250 phr of other or further additives;
- from $0.1 \cdot 10^{-3}$ to $42 \cdot 10^{31\ 3}$ mhr (mol per hundred parts of rubber) of a vulcanizing agent which crosslinks with a functionality>4; and
- from 0.1 to 10 phr of at least one vulcanization accelerator; and
- wherein the vulcanizing agent comprises

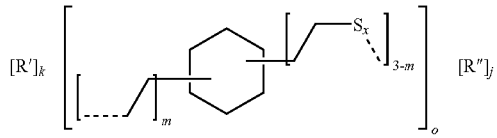

wherein each occurrence of subscripts n, o, k, j and x are integers independently given by m is 0 to 2; o, k, j are positive integers; and x is 2 to 8; wherein each R', R" is independently selected from the group consisting of a hydrogen atom, a monovalent hydrocarbon of up to 20 carbon atoms and a halogen atom.

3. A tire composition with a Shore A hardness, according to DIN 53 505 and ASTM D2240, of not less than 40 and not greater than 95 and a glass-transition temperature Tg (E"max), according to DIN 53 513 with a specified temperature sweep of −80° C. to +80° C. and a specified compression of 10+0.2% at 10 Hz, not less than −80° C. and not greater than 0 ° C., having the composition comprising:
- of at least one vulcanizable diene rubber selected from natural rubbers, synthetic polyisoprene rubbers, polyisobutylene rubbers, polybutadiene rubbers (BR), and random styrene-butadiene rubbers;
- from 35 to 300 phr of at least one active filler selected from carbon blacks, silicas, silicon based fillers, and metal oxides, of which at least 10 phr must be carbon black, silica, or some combination thereof;
- from 0 to 250 phr of other or further additives;
- from $0.1 \cdot 10^{-3}$ to $42 \cdot 10^{-3}$ mhr (mol per hundred parts of rubber) of a vulcanizing agent which crosslinks with a functionality>4; and
- from 0.1 to 10 phr of at least one vulcanization accelerator; and
- wherein the vulcanizing agent comprises

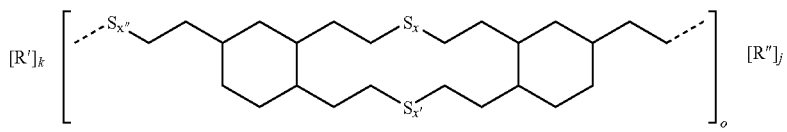

wherein each occurrence of subscripts k, o, j, x, x' and x" are integers independently given by x, x', x" are 2 to 8; o, k, j are positive integers; wherein each R', R" is independently selected from the group consisting of a hydrogen atom, a monovalent hydrocarbon of up to 20 carbon atoms and a halogen atom.

4. The tire composition as claimed in claim 3, wherein the vulcanizing agent comprises

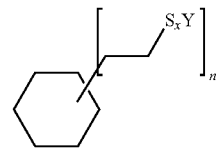

wherein each occurrence of subscripts k, o, j, x, x' and x" are integers independently given by x, x', x" are 2 to 8; o, k, j are positive integers; wherein each R', R" is independently selected from the group consisting of a hydrogen atom, a monovalent hydrocarbon of up to 20 carbon atoms and a halogen atom.

5. The tire composition as claimed in claim 1, wherein the vulcanizing agent comprises

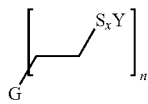

wherein G is a cyclic structure and each occurrence of Y is independently selected from a rubber active group; and each occurrence of subscripts x and n are integers independently given by x is 0 to 8 and n is 2 to 8.

6. The tire composition as claimed in claim 5, wherein the vulcanizing agent comprises

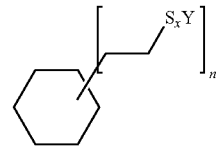

wherein each occurrence of Y is independently selected from a rubber active group; and each occurrence of subscripts x and n are integers independently given by x is 0 to 8 and n is 2 to 8.

7. The tire composition as claimed in claim 6, wherein the vulcanizing agent comprises

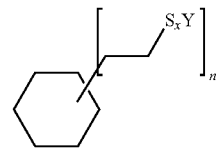

wherein each occurrence of Y is independently selected from a rubber active group comprising sulfur containing functionalities;
and each occurrence of subscripts x and n are integers independently given by x is 0 to 8 and n is 2 to 8.

8. The tire composition as claimed in claim 6, wherein the vulcanizing agent comprises

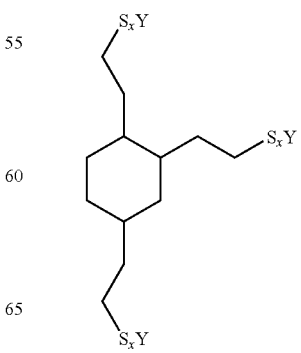

wherein each occurrence of Y is independently selected from a rubber active group comprising sulfur containing functionalities;

and each occurrence of subscripts x are integers independently given by x is 0 to 8.

9. The tire composition as claimed in claim 1, comprises from 30 to 100 phr of at least one diene rubber.

10. The tire composition as claimed in claim 1, further comprising additional ingredients:
wherein fillers comprises Silica, other metal oxides, other metal salts microgels or carbon black; wherein unsaturated elastomeres comprises SBR, BR, NR, IR, SIR, SIBR, IBR, SSBR, ESBR, IIR, HIIR, EPDM, NBR or mixtures thereof; and
wherein further additives comprises softeners.

11. The tire composition as claimed in claim 10, wherein softeners comprises mineral oils, vegetable oils, esters, low $M_w$-polymers, biomass-to-liquid-oils or blends thereof.

12. The tire composition as claimed in claim 1, wherein at least one diene rubber has been selected from the group consisting of natural polyisoprene and/or synthetic polyisoprene and/or polybutadiene and/or styrene-butadiene copolymer and/or solution-polymerized styrene-butadiene copolymer and/or emulsion-polymerized styrene-butadiene copolymer and/or butadiene-isoprene copolymer and/or styrene-isoprene-butadiene terpolymer and/or butyl rubber and/or halobutyl rubber.

13. The tire composition as claimed in claim 1, wherein the quantitative proportion of the entire amount of vulcanization accelerator is from 0.1 to 20 phr.

14. The tire composition as claimed in claim 13, wherein the quantitative proportion of the entire amount of vulcanization accelerator is from 0.1 to 15 phr.

15. The tire composition as claimed in claim 1, wherein the quantitative proportion of the further additives is from 10 to 220 phr.

16. The tire composition as claimed in claim 15, wherein the quantitative proportion of the further additives comprises from 10 to 200 phr.

17. The tire composition as claimed in claim 1, wherein the quantitative proportion of the fillers comprises from 35 to 150 phr.

18. The tire composition as claimed in claim 1, wherein the filler is at least one amorphous silica.

19. The tire composition as claimed in claim 1, wherein the filler comprises amorphous silica and carbon black.

20. The tire composition as claimed in claim 1, wherein the filler is at least one carbon black.

21. The tire composition as claim 20, wherein the carbon black has an iodine absorption number of from 25 to 300 g/kg and a DBP number from 50 to 300 cm$^3$/100 g.

22. In a method for producing a tire, the improvement which comprises utilizing a tire composition as claimed in claim 1, for producing said tire.

23. In a method for producing a tread of a tire, the improvement which comprises utilizing a tire composition as claimed in claim 1, for producing the tread of the tire.

24. In a method for producing a body mixture of a tire, the improvement which comprises utilizing a tire composition as claimed in claim 1, for producing the body mixture of the tire.

25. In a method for producing a body mixture of a tire, the improvement which comprises utilizing a tire composition as claimed in claim 1, for producing the body mixture of the tire, including sidewall, inner liner, apex, belt, shoulder, belt profile, squeegee, carcass, bead reinforcement, and/or solid tire.

\* \* \* \* \*